March 31, 1931.  B. V. HEDRICK  1,799,098
ROTARY PLOW
Filed Jan. 3, 1930   3 Sheets-Sheet 1
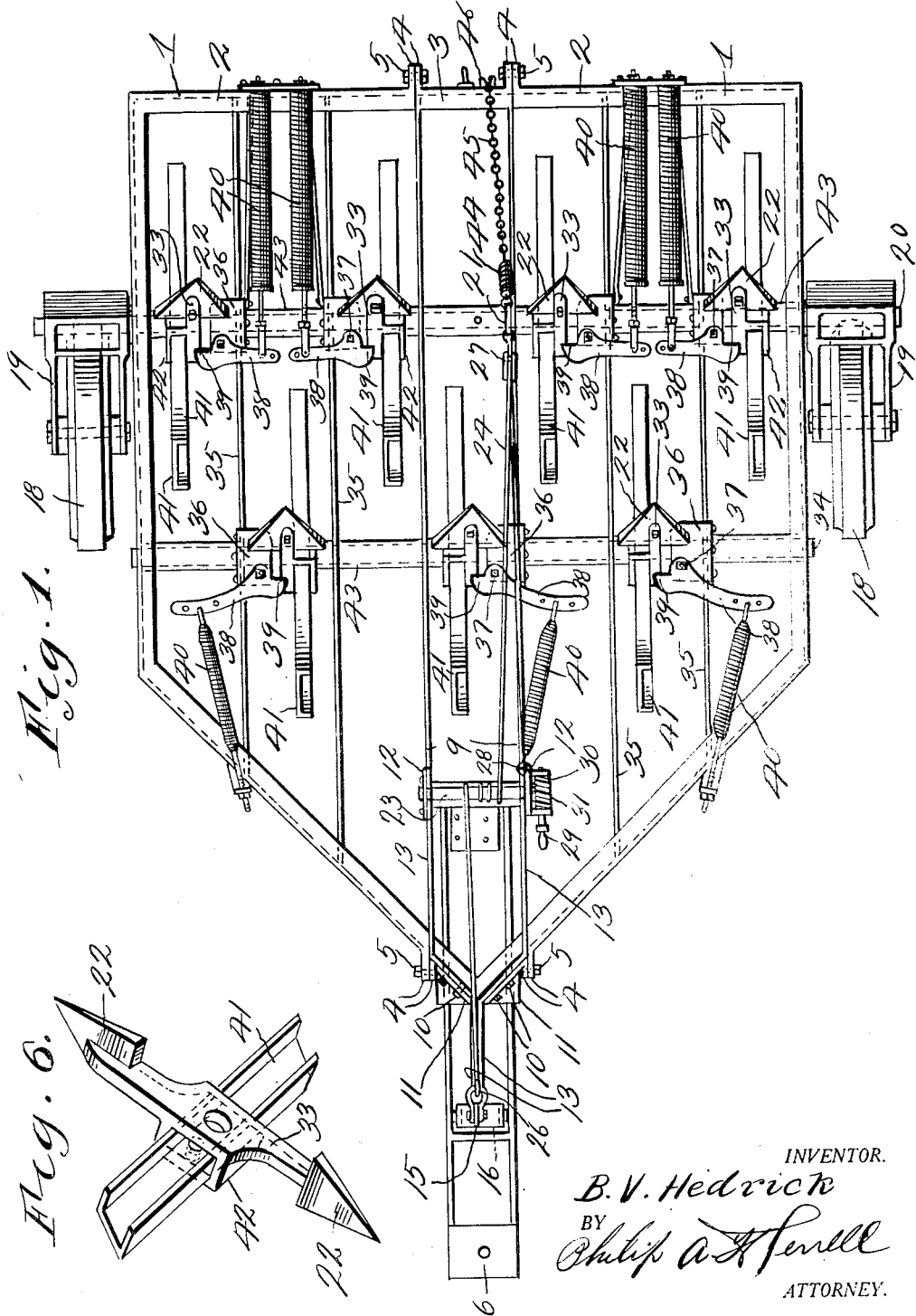
INVENTOR.
B. V. Hedrick
BY
ATTORNEY.

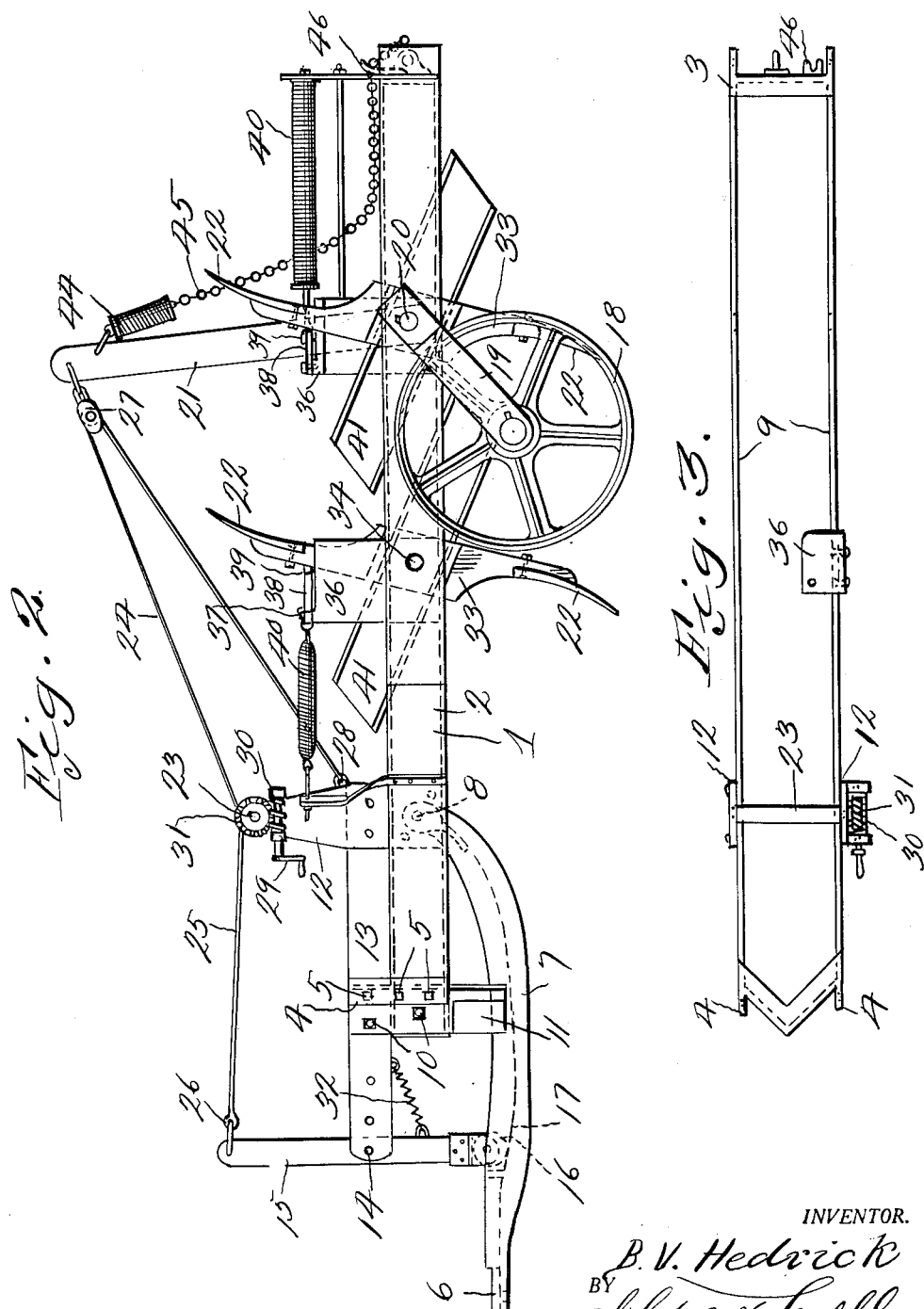

March 31, 1931.  B. V. HEDRICK  1,799,098
ROTARY PLOW
Filed Jan. 3, 1930  3 Sheets-Sheet 3
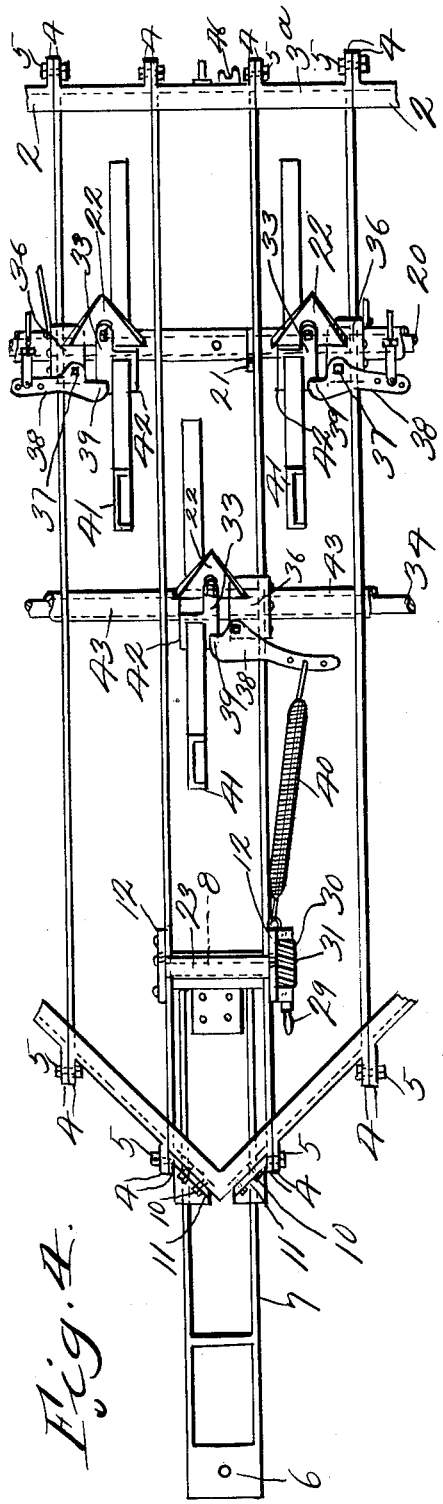
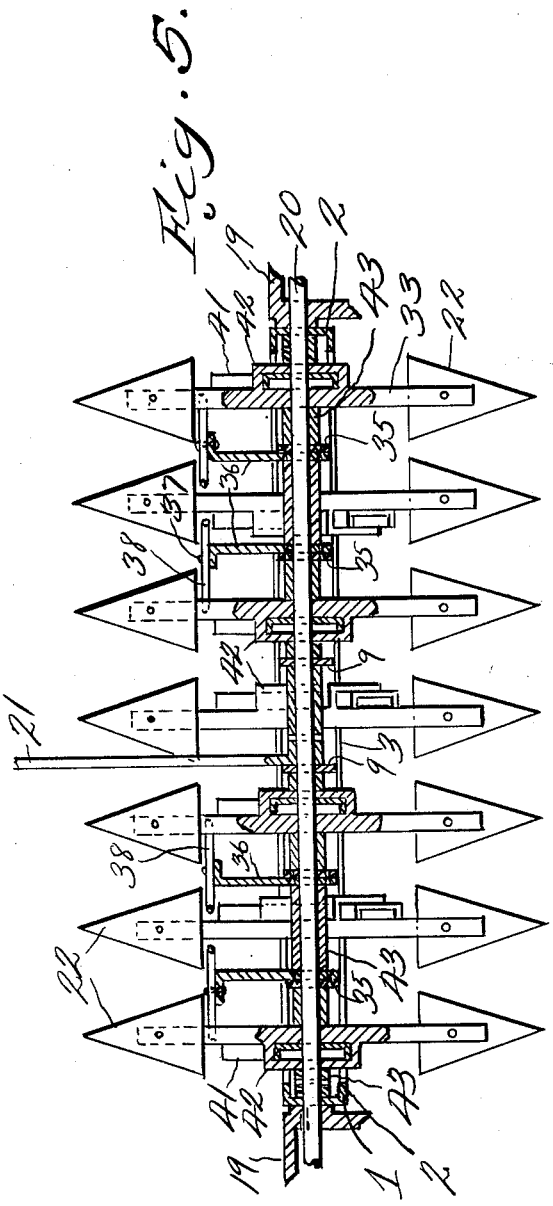
INVENTOR.
B. V. Hedrick
BY
ATTORNEY.

Patented Mar. 31, 1931

1,799,098

UNITED STATES PATENT OFFICE

BURL V. HEDRICK, OF SALISBURY, NORTH CAROLINA

ROTARY PLOW

Application filed January 3, 1930. Serial No. 418,298.

The invention relates to rotary gang plows and has for its object to provide a device of this character wherein plow stocks are carried rotatably on shafts, and provided with digging elements adapted to enter the soil for plowing purposes and spring catch members cooperating with the stocks for holding the same against rotation until the down digging element engages an obstruction, and at which time the stocks will be rotated against the action of the spring catch for allowing the continued movement of the gang plow as a whole, and the placing of the other plowing elements in the ground.

A further object is to provide cross members cooperating with the plow stocks whereby upon initial rearward movement of the plowing element in the ground upon engaging an obstruction, the crossed member will be moved to a position where it will enter the ground for completing the rotation of the stock.

A further object is to yieldably mount the stock catches with sufficient spring tension to hold the same against rotation under ordinary plowing operation, but to yield upon excessive strain, for instance when the plowing element hits an obstruction.

A further object is to provide the frame with a transverse rock shaft adjacent its rear end, and provided with downwardly extending bifurcated arms in the bifurcations of which ground engaging wheels are mounted. Also to provide lever and cable control means for rocking the rock shaft for regulating the elevation of the frame and its digging element in relation to the ground.

A further object is to provide the forward end of the frame with a forwardly extending skid adapted to be utilized as a hitch for connecting the device to a tractor, and lever and cable means cooperating with said skid for elevating or lowering the forward end of the gang plow frame.

A further object is to provide the skid with a downwardly and rearwardly inclined surface with which a roller carried by the lower end of a pivoted cable control lever cooperates; said lever being controlled in its movement in one direction by the cooperation of the roller with the inclined surface of the skid.

A further object is to provide the forward end of the main frame of the machine with downwardly extending members engaging opposite sides of the skid for bracing the same.

A further object is to construct the frame whereby additional sections may be placed centrally therein for accommodating the same to additional plowing elements, thereby allowing the machine to be enlarged when desired without discarding the entire machine.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the rotary plow.

Figure 2 is a side elevation.

Figure 3 is a top plan view of the central frame section removed and parts detached therefrom.

Figure 4 is a top plan view of a wider frame section adapted to receive the parts removed from the small frame section and additional parts.

Figure 5 is a vertical transverse sectional view through the plow taken on line 5—5 of Figure 2.

Figure 6 is a perspective view of one of the plow elements showing the turning bar carried thereby.

Referring to the drawings, the numeral 1 designates the horizontal frame of the machine, which frame is formed from side members 2 and a central removable member 3. Members 2 and 3 are provided with registering flanges 4, through which bolts 5 extend for securing the frame sections together. By providing means whereby the central section 3 may be removed, it will be seen by substituting therefor the frame section 3a shown in Figure 4, that the plow may be widened as desired. It will be noted that the plow is particularly adapted for use in connection with a tractor, which may be attached in any suitable manner to the forward end 6 of a downwardly and forwardly extending draft bar 7, the rear end of which is pivotally connected at 28 between the opposite bars 9 of the central frame section 3. The particular hitch may be of any construction according to the make of tractor.

Extending downwardly from the forward end of the central removable section 3 and removably connected thereto by means of bolts 10 are guide plates 11, which plates engage opposite sides of the draw bar 7 and brace the same in relation to the frame particularly under side strain when the tractor is making a turn. Extending upwardly from the bars 9 are plates 12, to which are secured forwardly extending members 13, between the forward ends of which is pivotally mounted at 14 a substantially vertically disposed lever 15. The lower end of the lever 15 is provided with a roller 16, which engages the downwardly and rearwardly inclined surface 17 of the draw bar 7, therefore it will be seen that when the lever 15 is rocked, the forward end of the frame 1 may be lowered or raised in relation to the ground.

The rear end of the main frame 1 is supported by ground engaging wheels 18, mounted in the upwardly extending bifurcated arms 19, and which arms are in turn secured to the transverse shaft 20, which shaft 20 is rocked by mechanism hereinafter set forth, and which mechanism cooperates with the upwardly extending lever 21.

Referring to Figure 2, it will be noted that the plow shovels 22 are in elevated positions. However it will be seen that by rocking the shaft 20 and lever 15 the main frame of the machine may be adjusted upwardly or downwardly in relation to the ground for positioning the plow shovels 22 where they will enter the ground for a plowing operation. The raising mechanism comprises a transverse rotatable shaft 23 carried by the upwardly extending members 12 mounted on the bars 9 and around which shaft the cable 24 extends. One end 25 of the cable extends forwardly and is connected at 26 to the upper end of the lever 15, and the other end of the cable 24 extends rearwardly through the pulley 27 carried by the upper end of the lever 21 and thence downwardly and is anchored at 28. Therefore it will be seen that when the operator grasps the crank 29 and rotates the worm 30, which meshes with the worm gear 31, the levers 21 and 15 may be simultaneously controlled. For instance the lever 21 may be pulled forwardly for moving the wheels 18 rearwardly beyond a vertical center for allowing the shovels 22 to enter the ground. At the same time the lower end of the pivoted lever 15 will move rearwardly incident to the roller 16 engaging an inclined surface 17, therefore it will be seen that the forward end of the frame will be simultaneously lowered. To assist in the rearward movement of lever 15, a coiled spring 32 is provided.

During the operation of the device the plowing elements move through the ground in the usual manner until they hit an obstruction, and at which time their stocks 33 rotate on the shafts 20 and 34 for positioning the upper shovels 22 in position to enter the ground, thereby preventing breaking of the plowing element or machine. Extending upwardly from the longitudinal bars 9 and bars 35 of the frame sections are plates 36, on the upper ends of which are pivotally mounted at 37 latches 38, the noses 39 of which engage the forward sides of the upper portions of the stocks 33 as clearly shown in Figure 2 and hold the stocks against rotation until an obstruction is engaged of sufficient rigidity to overcome the springs 40, and rotate the stocks on the shafts 20 and 34 until the crossed turning elements 41 engage the ground and complete the rotation of the stocks for again assuming the position shown in Figure 1. Crossed members 41 extend through rectangularly shaped sleeves 42 carried by the stocks 33 as clearly shown in Figure 6. It will be seen that when the shafts 20 and 34 are placed through the turning members 41 and the stocks, that the turning members and stocks are held in rigid relation with each other. Interposed between the stocks and the bars of the frame are spacing sleeves 43, which brace the frame as well as the shafts as clearly shown in Figure 5. It will be noted by referring to Figures 3 and 4, that when it is desired to widen the machine, the frame section 3a may be placed between the frame sections 2 after removal of section 3, and the parts from the section 3 may then be placed on section 3a and additional parts added to section 3a, thereby forming a complete machine wider and of greater capacity.

Connected to the lever 21 adjacent its upper end is a coiled spring 44, to the lower end of which is connected a chain 45 which extends rearwardly through a conventional form of bifurcated chain holder 46, said spring 44 forming means whereby upon extreme forward movement of the lever 21, during a frame lowering operation, the shock is absorbed, and it will be noted by adjusting the links of the chain 45, in the chain holder 46, that the shock absorbing device may be adjusted for absorbing the shock when the frame reaches various elevations.

From the above it will be seen that a rotary plowing device is provided which is simple in construction, and constructed in a manner whereby when any of the plowing elements engage an obstruction they will yield against spring action thereby moving out of the ground and to a position where the turning elements will engage the ground for completing the rotation of the stocks for allowing the plowing elements to pass over the obstruction, and at the same time a continued rotation of the stocks incident to the action of the turning elements will cause the other plowing elements to enter the ground.

The invention having been set forth what is claimed as new and useful is:—

1. The combination with the forward end of a rotary plow, of a draft connection, said draft connection comprising a downwardly and forwardly extending draft bar carried by the frame and terminating forwardly of the frame, a vertically disposed lever carried by the frame, the lower end of said lever having a roller, said roller engaging a downwardly and rearwardly inclined surface of the draft member, and means cooperating with the upper end of the lever for rocking the same.

2. The combination with a rotatable gang plow comprising a frame, of shafts extending transversely through said frame, double ended plow stocks rotatably mounted on the shaft, yieldable spring controlled latch members carried by the frame and engaging the stocks above the frame when they are substantially vertically disposed, plowing elements carried by the ends of said stocks and ground engaging turning members carried by the shafts and cooperating with the stocks.

3. The combination with a gang plow comprising a frame, transverse shafts carried by the frame, double ended plow stocks rotatably mounted on the shafts, of means for rotating said stocks on said shafts, said means comprising ground engaging members in crossed relation to the stocks and rotatable therewith and yieldable latch members carried by the frame and cooperating with the stocks to one side of the shafts.

4. The combination with a gang plow comprising a frame having transverse shafts, double ended plow stocks carried by said shafts, latch means cooperating with the stocks for holding the same against rotation until a predetermined pressure is obtained, of turning bars carried by the stocks and shafts, said turning bars extending through yokes carried by the stocks.

5. A rotary gang plow comprising a frame, means for raising and lowering said frame in relation to the ground, transverse shafts carried by the frame, double ended stocks carried by the shafts, plowing elements carried by said stocks, means cooperating with the stocks for holding the same against rotation until a predetermined pressure is applied to the plowing elements, yokes carried by the stocks, angularly disposed ground engaging turning members extending through said yokes, said shafts extending through said turning members.

6. The combination with the forward end of a plow frame, of a draft connection, said draft connection comprising a downwardly and forwardly extending draft bar carried by the frame, a vertically disposed lever carried by the frame, the lower end of said lever having a roller, said roller engaging the draft member and means cooperating with the lever for rocking the same.

7. The combination with the forward end of an agricultural implement frame, of a draft connection, said draft connection comprising a forwardly extending draft bar pivoted to the frame, a vertically disposed lever pivoted to the frame, the lower end of said lever having a sliding bearing connection on the draft member, and means cooperating with the lever for rocking the same.

In testimony whereof I hereunto affix my signature.

BURL V. HEDRICK.